June 27, 1939. E. W. ENGELMANN ET AL 2,164,056

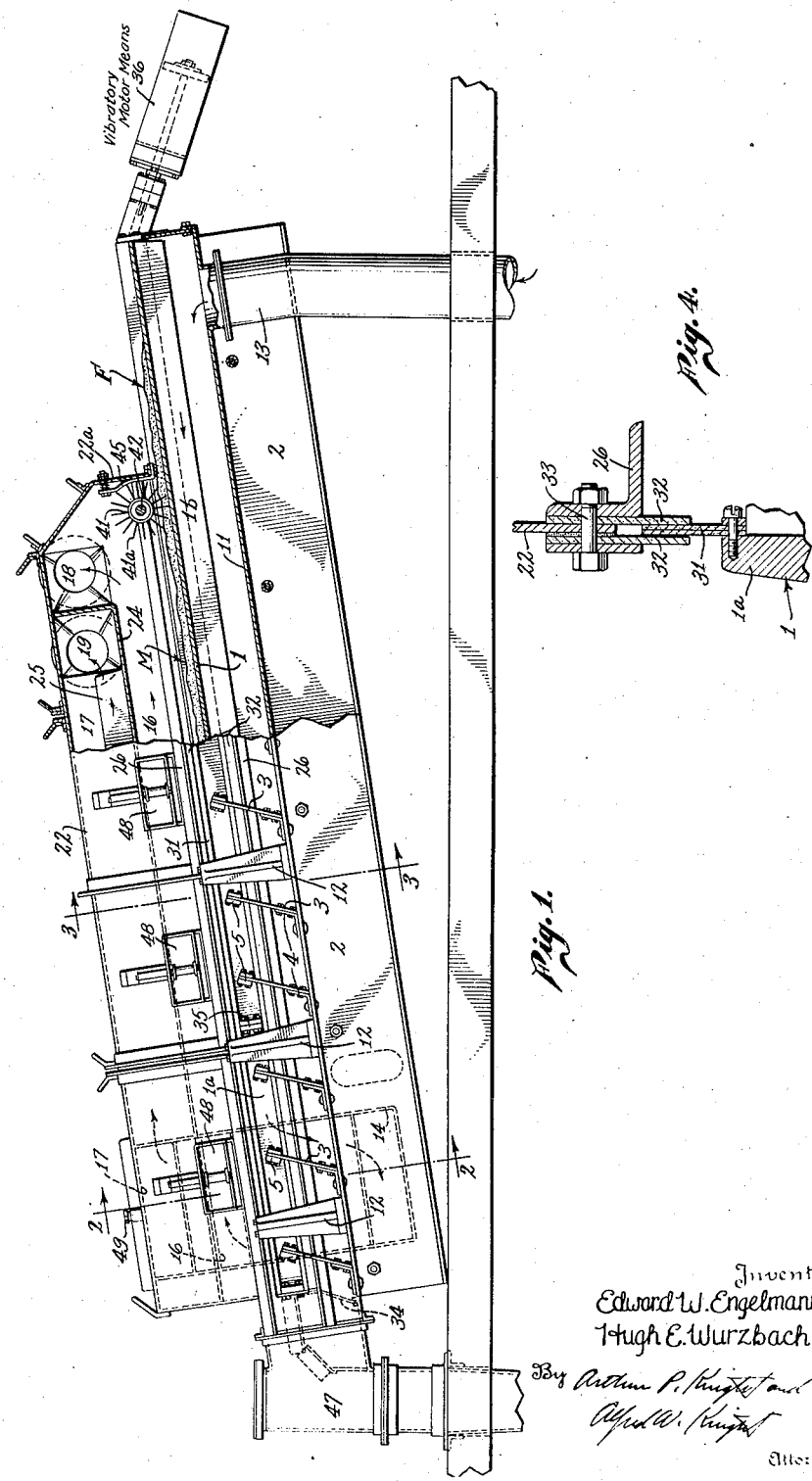

DRYING, HEATING, OR ROASTING CONVEYER APPARATUS

Filed Dec. 14, 1937 2 Sheets-Sheet 2

Inventors
Edward W. Engelmann
Hugh E. Wurzbach

By Arthur R. Knight and
Alfred W. Knight

Attorneys

Patented June 27, 1939

2,164,056

UNITED STATES PATENT OFFICE 2,164,056

DRYING, HEATING, OR ROASTING CONVEYER APPARATUS

Edward W. Engelmann and Hugh E. Wurzbach, Magna, Utah

Application December 14, 1937, Serial No. 179,714

4 Claims. (Cl. 34—38)

This invention pertains to drying, heating, or roasting apparatus, and is directed more particularly to an apparatus for simultaneous heating and transfer of a material from one point to another, i. e., for the heating and/or drying of a material while subjecting the same to movement or transfer between spaced locations.

One of the particular objects of the invention is to provide a drying or heating apparatus adapted to effect transfer of material from one point to another during the heating operation, and to secure the desired translatory movement of the material by a minimum relative movement between cooperating parts of the apparatus, whereby minimum difficulty is experienced in sealing the apparatus against escape of gases or dust to the atmosphere.

A further object of the invention is to provide a vibratory conveyer element associated with fixed casing means defining suitable passages for the conduction of heated gaseous materials in heat-exchanging contact with such conveyer element and/or with the material conveyed thereby.

A further object of the invention is to provide a vibratory conveyer element disposed within a fixed casing means arranged to define duct members for conduction of a heated gaseous medium in heat-exchanging relation to the material conveyed by said conveyer element, in which an advantageous form of sealing means is provided between the vibratory and fixed portions of the device to prevent escape of gases or dust to the atmosphere, such sealing means comprising cooperating sealing members in frictional sliding engagement with one another and adapted for relative movement in the direction of vibratory motion of said conveyer element with respect to said casing means.

Other objects and features of the invention will be brought out in connection with the description of the following preferred embodiments, as illustrated in certain figures of drawings, as follows:

Fig. 1 is a partly broken-away side elevation of the apparatus;

Fig. 4 is an enlarged sectional detail of a form of sealing means which may be employed between the fixed casing and the vibratory conveyer member.

Figure 3:
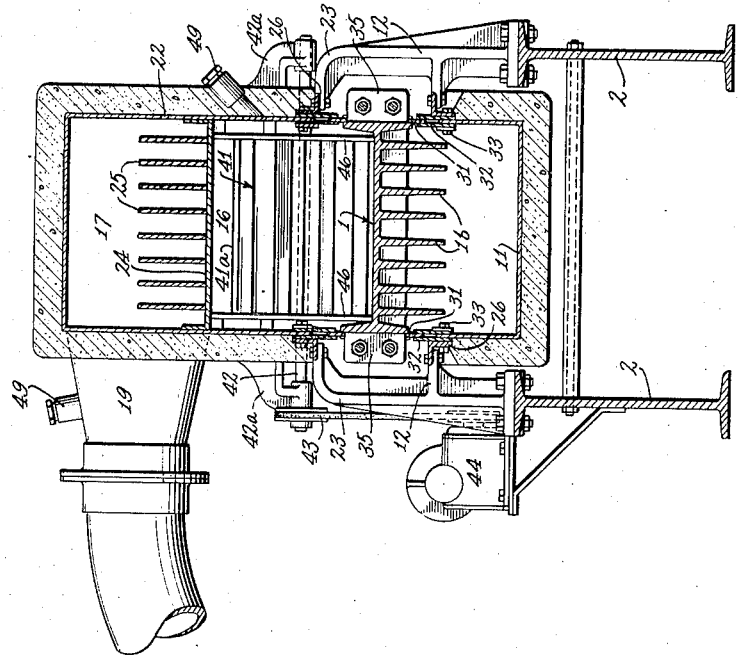
Fig. 3 is a comparable section taken on line 3—3 in Fig. 1.

The apparatus of the present invention comprises, essentially, an elongated material-receiving member such as a conveyer pan 1 mounted for vibratory movement on a frame 2 in any suitable manner, as through the agency of a plurality of steel reeds 3, the lower ends of which may be secured to the frame 2 as by brackets 4 and the upper ends of which may be secured to the pan 1 as by means of brackets 5. The reeds 3 are preferably inclined to the vertical whereby the actual weight of the pan 1 is resiliently supported on the base 2 through deformation of the reeds 3, according to established practice in the suspension of vibratory conveyers. The movement produced in the pan 1 is such as to have a substantial component in the direction of the length of said pan, according to conventional practice in the mounting of vibratory conveyers. In the preferred form herein illustrated, the support of the pan 1 is shown to be of the resilient type, but it will be appreciated that a non-resilient mounting may be provided, together with positive driving means as of the eccentric type. A harmonic motion having a substantial component in the direction of the length of the conveyer member is satisfactory where the conveyer member is inclined downwardly in the direction of travel of the material, but where the conveyer member is disposed horizontally or in an upwardly inclined manner, it is preferable that the driving means be such that an asymmetric movement is secured, resulting in a forward movement of the material supported by the conveyer.

Suitable duct means are provided adjacent the conveyer pan 1, for the conduction of heated gases in heat-exchanging relation thereto, said ducts being conveniently formed, for example, as housing or casing structures enclosing the respective upper and lower sides of said pan. In the specific embodiment shown, a casing 11 is provided at the bottom of the pan 1, extending substantially the full length thereof, and carried by suitable brackets 12 mounted on the frame 2. The duct 11 is provided with inlet means for supply of heated gases, as shown at 13, preferably adjacent the feed end of the conveyer pan 1, and with a discharge header 14 at the other end, communicating with a side duct 15. In this particular embodiment, two separate upper ducts are provided for returning the air in heat-exchanging relation to the upper side of the pan 1, as shown at 16 and 17. The duct 16 extends immediately above the pan 1, substantially the full length thereof and communicates with a discharge passage 18 which may communicate with any desired type of washing means or dust collection means for entrapping any dust which may be carried away from the device. The passage 17 extends contiguous to the passage 16 and is employed where direct contact of the gases with the conveyed material is not desired, said duct 17 being spaced from the pan 1 by the passage 16, and communicates with a suitable outlet passage 19 for disposal of the spent gases. The duct 15 is arranged to communicate with either or both of the ducts 16, through suitable side passages 16a and 17a shown in Fig. 2, suitable dampers 21 being preferably provided in the respective side passages for proper control of the relative proportions of gas supplied to the aforesaid passages. The two passages 16 and 17 are conveniently arranged in a common casing 22, mounted on suitable brackets 23 which may comprise extensions of the brackets 12, and divided by a longitudinal partition 24 which may be provided with a plurality of heat-conducting fins 25 extending upwardly into the passage 17 to facilitate dissipation of heat from the partition 24 into the space above the material M shown in section in Fig. 2. The casing 22 may be provided with an angle member 26 extending along the lower edge of each side wall, if desired, the brackets 23 being attached to such angles.

Figure 2:
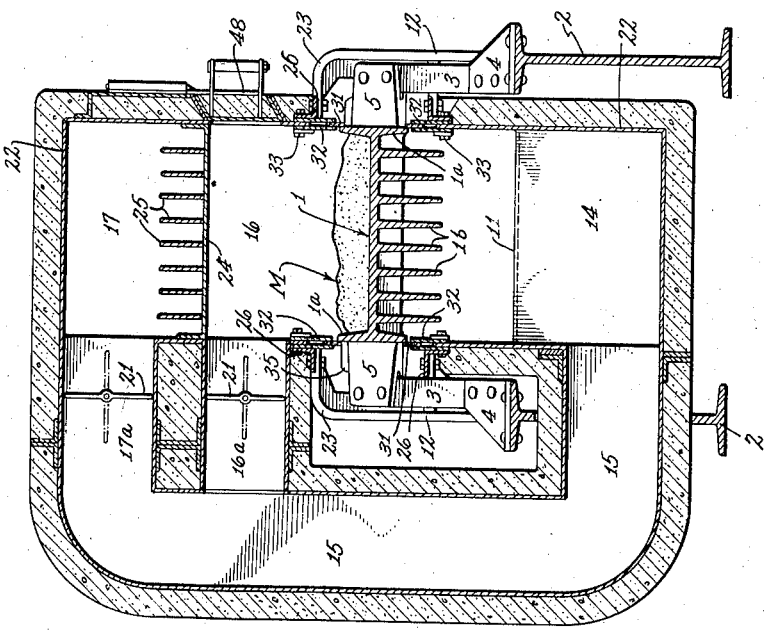
Fig. 2 is a transverse section thereof taken on line 2—2 in Fig. 1.

Suitable means are provided to prevent escape of gases and conveyed material from the pan 1 to the exterior and of gases from the duct 11, while providing free movement of the pan 1 with respect to the fixed housing portions of the apparatus. Such means may conveniently comprise cooperating male and female sealing means in sliding engagement with one another, such as a packing strip 31 bolted to each side of the wall portion 1a of the pan 1, both top and bottom, as shown in Figs. 2 and 3, forming a seal by sliding engagement in a groove formed of two spaced pieces of sheet metal 32 such as eighth-inch boiler plate secured to the respective housing portions as at 33. The end portions of the lower duct 11 may be sealed off through the agency of a flexible wall member 34 secured at its respective upper and lower ends to the pan 1 and the bottom wall of the duct 11 and in sliding engagement with the edge portions of said duct. A plurality of fins 1b are preferably provided for the lower wall of the pan 1 to facilitate heat transfer from the hot gases in passage 11, and these fins may conveniently be formed by casting the pan 1 with the fins integral therewith. The pan 1 may be made in relatively short lengths and bolted together as shown at 35 in Figs. 1 and 3, if desired, to facilitate construction of the device.

Any desired form of vibratory driving means may be provided to impart a longitudinal vibratory movement to the pan 1, such as an electric vibrating motor means as shown in U. S. Patent No. 2,071,373 and Reissue Patent No. 19,816, such means being indicated generally at 36 in Fig. 1. During transit, the material in the pan 1 is heated by conduction of heat through the conveyer pan and by the passage of hot air over the top of the material, either in direct contact therewith as through the passage 16 or in heat-radiating relation thereto as through the passage 17. The material is fed through the open right-hand end of the pan as indicated by the arrow F in Fig. 1, suitable sealing means being provided at the feeding end of the housing 22 to prevent undue egress of gases. Such means may conveniently comprise a multiple-bladed sealing wheel 41 rotatably mounted on the casing 22 as upon a shaft 42 carried in suitable brackets 42a, and driven through a belt 43 by a reduction gear motor drive 44, as shown more particularly in Fig. 3. A suitable flexible seal such as a spring biased sealing plate 45 is conveniently provided at the feed end 22a of the casing 22, in position to engage the tips of the blades 41a of the wheel 41, and suitable baffles or partitions are conveniently extended downwardly into the pan 1 at the side walls thereof as shown at 46, against which the axial ends of the vanes 41a may rub to complete the seal.

As the material is conveyed along the pan 1, it is subjected to the heating action of the gases as above described, and may be discharged from the lower end of the pan into a suitable header 47, as will be apparent to one skilled in the art. Suitable clean-out or inspection doors may be provided as at 48 along the length of the passage 16, whereby the pan 1 may be cleaned out on occasion. Suitable capped openings may be provided into the respective passages, as at 49, for the insertion of pyrometers or the like for the determination of temperature conditions within the device.

The spent gases discharged from the passages 18 and 19 may be conducted to any desired apparatus for the collection of any solid material carried thereby, as above brought out, and suitable suction or pressure blowers will be provided at such points as are necessary to secure proper circulation through the respective ducts.

The apparatus is adapted for use in the drying of solids, either with or without heat, for the roasting of ores, and the like, while effecting a translatory movement of such material. In this connection, it may be pointed out that the delineated angle of inclination of the conveyer pan is illustrative only, and any desired angular disposition thereof may be made, depending upon the operation characteristics of the vibratory driving means and upon the material-handling problem in a particular case.

It will be appreciated that considerable modification in the actual structure will be possible without departing from the spirit of this invention, and we do not choose to be limited to the specific embodiments herein shown but rather to the scope of the subjoined claims. For example, the heat supply for the device may be provided by establishing burner means below the pan 1, at the position of the passage 11, if desired, instead of supplying a heated gas to an enclosed chamber as herein brought out. Furthermore, it is not essential that the pan 1 be subjected to continuous vibratory movement, inasmuch as intermittent operation thereof may be relied upon to control the rate of travel of the material through the heating zone.

We claim:

1. A drying or heating apparatus, which comprises: an elongated material-receiving and conveying member defining a trough-like member having upstanding side walls; a casing member disposed above said conveying member and having side wall portions abutting said upstanding side walls, said casing member extending along the length of said conveying member and defining therewith passage means for conducting a heated gaseous medium along the length of said trough; supporting means maintaining said casing means in fixed position; means supporting said conveying member for vibratory movement in a direction having a substantial component in the direction of the length of said conveying member; cooperating sealing means mounted on the respective abutting side wall portions of said casing and conveying members to seal said passage means from the atmosphere; vibratory motor means associated with said conveying member for producing the vibratory movement thereof, a second casing member disposed below said conveying member and extending along the length thereof, said second casing member being provided with side wall portions abutting the side wall portions of said conveying member, and defining therewith a second passage means for conducting a heated gaseous medium along the length of said conveying member; duct means at one end of said second passage means establishing communication between said first named passage means and said second passage means; means supporting said second casing means in fixed position; and cooperating sealing means mounted on the respective abutting side wall portions of said second casing member and said conveying member to seal said second passage from the atmosphere.

2. A drying or heating apparatus which comprises: an elongated material-receiving and conveying element defining a trough-like member; a casing member extending below said element and defining therewith an elongated passage for conducting a heated gaseous medium in heat-exchanging relation to said element at the lower surface thereof; a second casing member disposed above said element and defining a second elongated passage having a bottom wall extending above said trough member in spaced heat-exchanging relation thereto; means supporting both of said casing members in fixed position; means supporting said element for vibratory movement in a direction having a substantial component in the direction of the length of said element; duct means adjacent one end of said element establishing communication between the first-named passage and said second passage; cooperating sealing means associated with said element and with the respective casing members to seal the first-named passage and the space between said element and said bottom wall of the second passage from the atmosphere along the length of said casing members; and vibratory motor means associated with said conveying element for effecting vibratory movement thereof.

3. A drying or heating apparatus which comprises: an elongated material-receiving and conveying element defining a trough-like member; a casing member extending below said element and defining therewith an elongated passage for conducting a heated gaseous medium in heat-exchanging relation to said element at the lower surface thereof; a second casing member disposed above said element and defining therewith an elongated space above said element; partition means within said second casing, disposed above and in spaced heat-exchanging relation to said element and dividing said elongated space into two superimposed passages, the lower of said superimposed passages being in part defined by said element and the upper of said passages being wholly spaced from said element; means supporting both of said casing members in fixed position; means supporting said element for vibratory movement in a direction having a substantial component in the direction of the length of said element; duct means adjacent one end of said element establishing communication between said first-named passage and both of said superimposed passages; cooperating sealing means associated with said element and with the respective casing members to seal the first-named passage and the lower passage of said two superimposed passages from the atmosphere along the length of said passages; and vibratory motor means associated with said conveying element for effecting vibratory movement thereof.

4. The apparatus set forth in claim 3, and comprising in addition: damper means associated with said duct means and at least one of said superimposed passages for controlling communication therebetween.

EDWARD W. ENGELMANN.
HUGH E. WURZBACH.